United States Patent [19]

Hrovat et al.

[11] 4,140,738

[45] Feb. 20, 1979

[54] PROCESS FOR THE PRODUCTION OF BLOCK FUEL ELEMENTS FOR HIGH TEMPERATURE REACTORS

[75] Inventors: Milan Hrovat, Rodenbach; Lothar Rachor, Hanau, both of Fed. Rep. of Germany

[73] Assignee: Hobeg Hochtemperaturreaktor-Brennelement GmbH, Hanau, Fed. Rep. of Germany

[21] Appl. No.: 774,953

[22] Filed: Mar. 7, 1977

Related U.S. Application Data

[63] Continuation-in-part of Ser. No. 768,633, Feb. 14, 1977.

[30] Foreign Application Priority Data

Mar. 8, 1976 [DE] Fed. Rep. of Germany ....... 2609476

[51] Int. Cl.² ............................................. G21C 21/00
[52] U.S. Cl. ................................................ 264/0.5
[58] Field of Search ......................................... 264/0.5

[56] References Cited

U.S. PATENT DOCUMENTS 3,845,178  10/1974  Hrovat et al. ........................ 264/0.5
3,975,471   8/1976  Hrovat et al. ........................ 264/0.5
4,024,209   5/1977  Ballard et al. ....................... 264/0.5

FOREIGN PATENT DOCUMENTS 1264943  2/1972  United Kingdom.

Primary Examiner—Brooks H. Hunt
Attorney, Agent, or Firm—Cushman, Darby & Cushman

[57] ABSTRACT

There is provided a process for the production of block fuel elements for gas cooled high temperature reactors by multiple step molding of a granulated graphite material comprising a mixture of natural graphite powder, synthetic graphite powder and binder resin together with coated fissile and fertile fuel particles using a lubricant and a hydrocarbon, alcohol, phenol, amine, aldehyde, ketone or ether as an air displacing agent whereby the outer form and the cooling gas channels are produced by molding and the molding temperature in the last molding step is above the softening point of the binder resin and wherein the binder resin is so chosen that it has a softening point at least 15° C above the melting point of the lubricant used and the block is ejected from the die in the temperature interval between the melting point of the lubricant and the softening point of the binder resin.

10 Claims, No Drawings

PROCESS FOR THE PRODUCTION OF BLOCK FUEL ELEMENTS FOR HIGH TEMPERATURE REACTORS

CROSS-REFERENCE TO RELATED APPLICATION

This application is a continuation-in-part of Hrovat et al. U.S. application Ser. No. 768,633 filed Feb. 14, 1977. The entire disclosure of the parent application is hereby incorporated by reference and relied upon.

BACKGROUND OF THE INVENTION

The present invention is directed to a process for the production of molded block fuel elements for gas cooled high temperature reactors by plural step pressing of a granulated graphite material made of graphite and binder resin together with coated fissile and fertile fuel particles using a lubricant and a hydrocarbon, alcohol, phenol, amine, aldehyde, ketone or ether as an air displacing agent.

The molded block fuel elements for high temperature reactors, also called "monolith" for short, is generally a 700 to 1000 mm high hexagonal prism with a width over the flats of, for example, 360 mm and a weight of about 150 kg. The monolith is made of homogeneous fine crystalline graphite matrix of high heat conductivity, fuel regions with the same matrix and cooling channels. The fuel regions contain the fuel in the form of coated particles which are embedded in the graphite matrix. According to the construction of the fuel element the number of fuel zones usually is 138 to 216 and the corresponding number of cooling channels is 72 to 108. In contrast to a bored block and to mechanically worked graphite fuel elements with loosely filled fuel inserts the fuel zones of the monolith are well bonded to the remaining graphite matrix so that both parts of the block, that is the fuel containing graphite matrix and the fuel free zone form a monolithic structure with good heat transfer. Therewith a high cooling gas temperature is reached at relatively low fuel temperature. The further advantages of monoliths are described in Hrovat German Pat. No. 1,902,994.

The monolith is generally produced from granulated graphite material containing binder resin and coated fuel particles by molding. The principles for production is described in Hrovat German Pat. Nos. 2,104,431 and (and related Hrovat U.S. application Ser. No. 577,054 filed May 13, 1975) and 2,234,587 (and related Huschka U.S. Pat. No. 3,985,844). The entire disclosure of the Hrovat U.S. application and Huschka U.S. patent are hereby incorporated by reference and relied upon.

A series of requirements are placed on the block fuel elements. Besides high strength and conductivity properties there are demanded of the block matrix narrow tolerances in dimension. The outer dimensions of the hexagonal prism as well as the diameter and the positions of the numerous cooling channels and fuel regions produced by pressing only permit a deviation of several tenths of a millimeter together and for the longitudinal axis of the block from the nominal value. Since the coating of the fissile and fertile fuel particles must remain intact in the production of the fuel element, the pressure in molding and ejecting the block from the die is limited.

According to the previously known molding process in spite of the use of a lubricant, the block fuel elements cannot be ejected in stable form from the tool because of the unfavorable block shape and numerous metal rods installation for molding of cooling channels (72-108 per block). The block ejected in the plastic range of the binder resin have a tendency to form cracks and change shape. Below the plastic range the lubricant likewise begins to solidify whereby the friction increases so sharply that in ejecting the permissable load of the coated particles is exceeded.

The problem of the present invention therefore was to get around the described technological difficulties in the production of block fuel elements for high temperature reactors and to be able to eject the finished molded block fuel element undamaged from the tool at such a low pressure that the mechanical integrity of the coated particles is not endangered.

SUMMARY OF THE INVENTION

The problem was solved by the invention by so selecting a binder resin that has a softening point at least 15° C. above the melting point of the lubricant used and by ejecting the block from the die in the temperature interval between the melting point of the lubricant and the softening point of the binder resin. There is no critical upper limit on the thermoplastic binder resin.

Preferably a binder resin is chosen whose softening point is about 25–40° C. above the melting point of the lubricant. According to the invention the finish pressed block is cooled in all of its regions to a temperature at which the binder resin completely solidifies while the lubricant is still fluid and therefore remains completely effective. With the relatively wide temperature interval of about 30° C. local temperatures differences which are unavoidable under industrially required quick cooling can be overcome. As lubricants there are preferably used stearic acid, hard paraffins with melting points between 50 and 70° C. and octadecanol.

As set forth in parent Hrovat application Ser. No. 768,633 filed Feb. 14, 1977, there is also incorporated into the granulated graphite material an organic compound which is a hydrocarbon or substituted hydrocarbon and whose vapor pressure increases from a very low value at room temperature, e.g., below 10 Torr at 20° C., to about 760 Torr at pressing or molding temperature and which is again condensed into a liquid phase already at moderate forming pressure in the molding step. The pressing temperature is usually between 100 and 200° C. and the forming pressure is usually about 80 to 150 bar.

During the heating to the pressing temperature the aifr contained in the assembled steel die is displaced by vapor formation of the hydrocarbon (or substituted hydrocarbon additive) and therewith the pressure stress in the block as a result of the expansion of compressed air in its critical impermeable range is prevented in the subsequent carbonization. The air displacing agent which is condensed into a liquid phase by molding vaporizes later during the carbonization at a temperature in which the graphite matrix already begins to become gas permeable and can be allowed to escape without pressure so that no swellings and other deformations can arise.

The content of air displacing agent is adjusted according to the pore and intermediate space of the prepressed block charged with heavy metal. Advantageously the content of air displacing agent is within the range of 0.2 to 2 weight %.

For the production of a homogeneous molding powder mixture the stearic acid or other lubricant is melted, a hydrocarbon or substituted hydrocarbon, for example octanol, added and a portion of about 2 to 10 weight % of the resinated graphite matrix powder required to produce a block stirred into the melt and then the melt is cooled. This mixture is now capable of being ground and is ground and dry mixed into the rest of the molding powder charge.

As air displacing agent there can be employed in general aromatic, cycloaliphatic and aliphatic hydrocarbons, alcohols, phenols, aldehydes, ketones, ethers and amines insofar as the boiling point is near the pressing or molding temperature, the vapor pressure is very low at room temperature and the solubility for the phenol-formaldehyde resin or other binder (e.g., diphenylolpropane-epichlorhydrin resins, unsaturated polyesters) is low. As examples there can be used nonane, decane, decalin, cumene, mesitylene, amyl alcohol, hexanols, e.g., hexanol-1 and hexanol-2, heptanols, e.g., heptanol-1, octanols, e.g., octanol-1 and octanol-2, nonanols, e.g., nonanol-1, cyclohexanol, benzyl alcohol, cresols, e.g., m-cresol or cresylic acid, dibutyl ketone, cyclohexanone, mesityl oxide, dibutyl ether, toluidine, n-heptaldehyde and benzaldehyde. Especially advantageous are aliphatic alcohols, e.g., alkanols, particularly the two hexanol isomers hexanol-1 and hexanol-2 and the two octanol isomers octanol-1 and octanol-2. The insertion of hexanol or octanol depends on the pressing temperature and this in turn depends on the softening point and the viscosity of the binder resin used. If in the molding the temperature is fixed at 135°–140° C. then hexanol-2 with a boiling point of 139.9° C. is especially well suited. At higher molding temperature which is in the range between 180°–200° C. octanol-2 with a boiling point of 178.5° C. or octanol-1 with a boiling point of 195.2° C. is preferred. Both the alcohols hexanol and octanol and their isomers are distinguished by the relatively low vapor pressure of below 10 Torr at room temperature.

As fissile materials there can be used for example oxides or carbides of U 235, U 233 and fissionable plutonium isotopes and as fertile materials the oxides and carbides of U 238 and/or Th 232.

In addition to phenol-formaldehyde novolaks other suitable binders include the previously mentioned polyesters and epoxy resins as well as xylenol or cresol-formaldehyde resins or furfuryl alcohol resins. The binder resin is usually employed in an amount of 10 to 30% of the graphite by weight.

Unless otherwise indicated all parts and percentages are by weight.

The following examples further explain the process of the invention.

DESCRIPTION OF THE PREFERRED EMBODIMENTS

The following example further explains the process of the invention.

A resinated graphite matrix powder was produced from a mixture of 64 weight % natural graphite powder, 16 weight % graphitized petroleum coke powder and 20 weight % phenol-formaldehyde binder resin dissolved in methanol by kneading, drying and grinding. There can be used as natural graphite powder a nuclear pure natural graphite having an ash content of 150 ppm, an average particle diameter of 15$\mu$ and high crystallinity (crystallite size $L_c$ = 1000 Å), as graphitized needle coke powder there can be used a needle coke graphitized at 3000° C. and having an extremely low ash content (ash <10 ppm), an average particle diameter of 25$\mu$, and a crystallite size $L_c$ of 600 Å and as binder resin a phenol-formaldehyde synthetic resin of the novolak type. The binder resin had a molecular weight of 740, a pH value of 6, an ash content of 160 ppm, a viscosity in a 50% methanol solution of 174 cps at room temperature and a softening point of 105° C.; the molding powder was mixed with 1 weight % of stearic acid melting at 69.3° C. as a lubricant and 0.4 weight % of octanol-1 with a density of 0.815 g/cm$^3$ and a boiling point of 195.2° C. as an air displacing agent. The stearic acid was melted to produce a homogeneous mixture, the octanol added and 10 weight % of the matrix powder used stirred into the melt and the mixture allowed to cool. The product which was now capable of being ground, after comminution to a particle size <1 mm, was dry mixed into the remainder of the powder charge and granulate produced therefrom with a particle size of 0.314 <d <3.14 mm.

Next 96 kg of granulate graphite material were preliminarily molded in a hexagonal die at room temperature to the fuel free block framework with a relatively low density of 1.2 g/cm$^3$ with a molding pressure of 50 bar. The die contained 210 polished metal rods for the formation of channels (72 with a diameter of 21 mm for the cooling and 138 with a diameter of 17 mm for receiving fuel). After removal of the shaping rods from the fuel positions the block was loaded with a homogeneous mixture consisting of 21 kg of granulated graphite material, 28 kg of fertile and 5 kg of fissile coated fuel particles. The fertile particles were made of ThO$_2$ (17 kg Th) coated with pyrolytic carbon and fissile particles were made of UC$_2$ (1 kg U) coated with pyrolytic carbon and silicon carbide. The method for the production of such a homogeneous mixture is described in German Offenlegungsschrift No. 2,333,094, the entire disclosure of which is hereby incorporated by reference and relied upon. The finished loaded block was heated with the hexanol die to 180° C. and at a pressure of 120 bar pressed to a matrix density of 1.92 g/cm$^3$. After cooling to a temperature of 80° C. the block was ejected from the die at a pressure which was considerably below the molding pressure and was only 90 bar. In a two step heat treatment the block was next heated in argon purge to 800° C. and thereby the binder was carbonized. Subsequently the block was heated thoroughly in a vacuum at 10$^{-3}$ Torr and a maximum temperature of 1950° C.

After the ejection and after the heat treatment there were not observed any cracks or deformations. The block dimensions after the ejection and after the heat treatment are set forth in the following table. The target value for the width over the flats of the heat treated block was 360 mm.

TABLE

| | | After Ejection | After Heat Treatment |
|---|---|---|---|
| Width over the flats (mm) | upper | 365.8 | 360.1 |
| | middle | 365.8 | 360.2 |
| | bottom | 365.8 | 360.0 |
| Length (mm) | | 781.0 | 792.6 |

What is claimed is:

1. In a process for the production of a block fuel element for a gas cooled high temperature reactor by multiple step molding of a granulated graphite material comprising a mixture of natural graphite powder, synthetic graphite powder and binder resin together with coated fissile and fertile fuel particles using a lubricant and an air displacing agent and wherein the outer form and the cooling gas channels are produced by molding and wherein the molding temperature in the last molding step is above the softening point of the binder resin, the improvement comprising employing a binder resin that has a softening point at least 15° C. above the melting point of the lubricant used, after the last molding step cooling the block fuel element to a temperature below the softening point of the binder resin and above the melting point of the lubricant and ejecting the block from the die in the temperature interval between the melting point of the lubricant and the softening point of the binder resin.

2. The process of claim 1 wherein the air displacing agent is an organic compound having a very low vapor pressure at room temperature and a vapor pressure of about 760 Torr at the molding temperature, said organic compound being liquifiable under moderate pressure at the molding temperature.

3. The process of claim 2 wherein the air displacing agent is a hydrocarbon, alcohol, phenol, amine, aldehyde, ketone or ether.

4. The process according to claim 3 wherein the air displacing agent has a vapor pressure less than 10 Torr at room temperature.

5. The process of claim 4 wherein the air displacing agent has a boiling point of 131° to 212° C.

6. The process of claim 5 wherein the molding temperature is from 135° to 200° C.

7. The process of claim 1 wherein the binder is a phenol-formaldehyde novolak.

8. The process of claim 7 wherein the lubricant is stearic acid.

9. The process of claim 8 wherein the air displacing agent is octanol.

10. The process of claim 1 wherein the binder resin has a softening point of 25° to 40° C. above the melting point of the lubricant.

* * * * *